(No Model.)

J. W. HEDGES & J. S. & T. J. GILL.
DITCH AND ROAD SCRAPER.

No. 281,875. Patented July 24, 1883.

WITNESSES:

INVENTOR:
J. W. Hedges
J. S. Gill
T. J. Gill
BY
ATTORNEYS.

UNITED STATES PATENT OFFICE.

JONATHAN W. HEDGES, JOSHUA S. GILL, AND THOMAS J. GILL, OF RICHWOOD, OHIO.

DITCH AND ROAD SCRAPER.

SPECIFICATION forming part of Letters Patent No. 281,875, dated July 24, 1883.

Application filed May 9, 1883. (No model.)

*To all whom it may concern:*

Be it known that we, JONATHAN W. HEDGES, JOSHUA S. GILL, and THOMAS J. GILL, of Richwood, in the county of Union and State of Ohio, have invented a new and Improved Ditch and Road Scraper, of which the following is a full, clear, and exact description.

Our improved scraper consists of a sheet-metal scoop pivoted near the rear end and at or about the top of the sides between a pair of beams, from which pivots a pair of curved braces extend forward along the beams and through them to the sides of the scoop, to which they are connected for guides, which run forward and backward through the beams as the scoop turns on its pivots for loading and dumping; and there are spring-latches which fasten the scoop and braces together while taking the load, with trip-levers attached to the beam-handles for enabling the operator to unfasten the scoop at will for dumping, the contrivance being very simple to construct and to operate, and also being durable and substantial, all as hereinafter fully described.

Reference is to be had to the accompanying drawings, forming a part of this specification, in which similar letters of reference indicate corresponding parts in both the figures.

Figure 1:
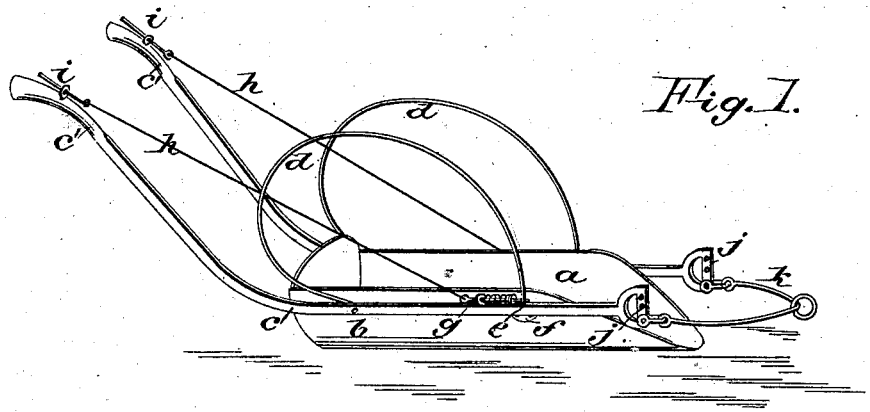
Figure 2:
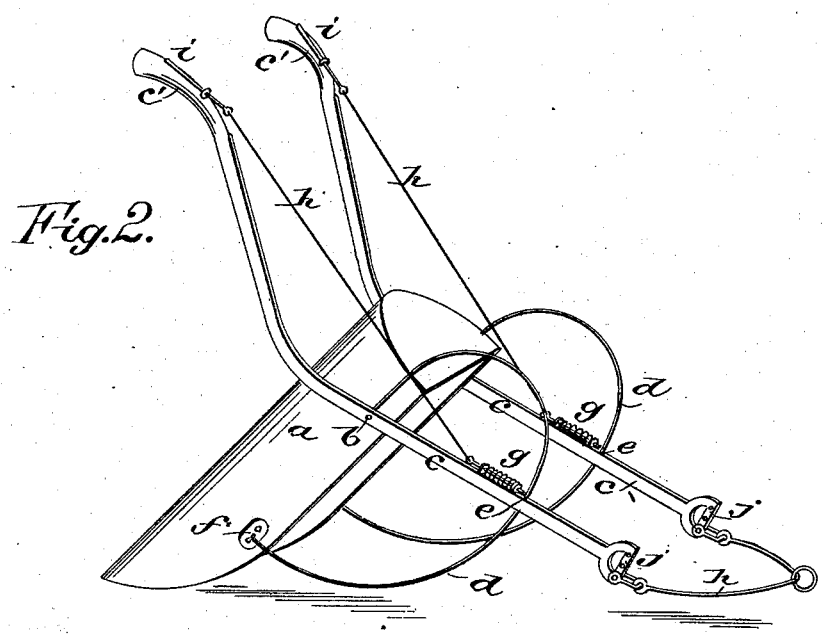

Figure 1 is a perspective view of our improved scraper in the position for loading, and Fig. 2 is a perspective view of it in the dumping position.

We make a sheet-metal scoop, $a$, substantially in the same form as a flour-scoop, but of proper size and strength for a scraper, and pivot it, at $b$, between two beams, $c$, which, from said pivots $b$ to the forward ends, are level and parallel, or thereabout; but they rise up behind said pivots and form handles $c'$.

From the pivot-points $b$ we arrange a couple of curved iron braces, $d$, to extend upward, forward, and downward, so that they pass through the beams at $e$, and connect below them to the sides of the scoop, near the front end, at $f$, said braces being for the most part of their length backward from where they pass through the beams circumferential to the axis $b$, so that the scoop may swing on said axis for dumping and for returning to the position for loading.

To secure the scoop in the position for scraping up its load, we provide a spring bolt or latch, $g$, on each beam $c$, arranged to engage the braces and lock the scoop to the beams until unfastened, for which they are connected by wires $h$ with trip-levers $i$, pivoted on their handles, where the operator may press them down at will to trip the scoop whenever it is ready to be dumped. The beams have each a clevis, $j$, at the front end, for hitching on any approved yoke, $k$, by which to hitch on the horses.

Our improved scraper is useful for making ditches as well as roads, and we propose to use it for that purpose also.

Having thus described our invention, we claim as new and desire to secure by Letters Patent—

1. The scoop $a$, beams $c$, and braces $d$, combined and arranged substantially as described.

2. The combination, in a scraper, of the scoop $a$, beams $c$, braces $d$, and spring-latches $g$, said latches being connected with the levers $i$ on the handles $c'$, substantially as described.

JONATHAN W. HEDGES.
JOSHUA S. GILL.
THOMAS J. GILL.

Witnesses:
A. FARIS,
S. S. GARDINER.